(12) United States Patent
Mullins

(10) Patent No.: US 10,347,046 B2
(45) Date of Patent: Jul. 9, 2019

(54) AUGMENTED REALITY TRANSPORTATION NOTIFICATION SYSTEM

(71) Applicant: DAQRI, LLC, Los Angeles, CA (US)

(72) Inventor: Brian Mullins, Altadena, CA (US)

(73) Assignee: DAQRI, LLC, Los Angeles, CA (US)

( * ) Notice: Subject to any disclaimer, the term of this patent is extended or adjusted under 35 U.S.C. 154(b) by 50 days.

(21) Appl. No.: 15/625,229

(22) Filed: Jun. 16, 2017

(65) Prior Publication Data
US 2018/0365893 A1   Dec. 20, 2018

(51) Int. Cl.
| G01C 21/36 | (2006.01) |
| G06T 19/00 | (2011.01) |
| G02B 27/01 | (2006.01) |
| G06T 19/20 | (2011.01) |

(52) U.S. Cl.
CPC ........ *G06T 19/003* (2013.01); *G01C 21/3647* (2013.01); *G01C 21/3661* (2013.01); *G02B 27/0101* (2013.01); *G02B 27/0172* (2013.01); *G06T 19/006* (2013.01); *G06T 19/20* (2013.01); *G02B 2027/0178* (2013.01); *G06T 2219/2016* (2013.01)

(58) Field of Classification Search
None
See application file for complete search history.

(56) References Cited

U.S. PATENT DOCUMENTS

| 2011/0199479 A1* | 8/2011 | Waldman ........... G01C 21/3602 |
| | | 348/116 |
| 2014/0278053 A1* | 9/2014 | Wu ........................ G06T 11/00 |
| | | 701/408 |
| 2016/0349062 A1* | 12/2016 | Campan ................. G01C 21/20 |
| 2017/0343375 A1* | 11/2017 | Kamhi ..................... H04W 4/40 |

* cited by examiner

*Primary Examiner* — Jonathan M Dager
*Assistant Examiner* — Garrett F Evans
(74) *Attorney, Agent, or Firm* — Schwegman Lundberg & Woessner, P.A.

(57) ABSTRACT

A first augmented-reality (AR) device comprises an optical sensor, a geographic location sensor, an orientation sensor, and a display. The first AR device accesses a first geographic location of the first AR device and an orientation of the first AR device and generates a picture taken at the first geographic location of the first AR device and associated with the orientation of the first AR device. The first AR device retrieves, from a server, transportation information from a second AR device in a vehicle. The server assigns the second AR device to the first AR device. The first AR device forms transportation AR content based on the transportation information and displays the transportation AR content in the display based on the first geographic location and orientation of the first AR device, the transportation information, and the picture generated at the first geographic location of the first AR device.

16 Claims, 5 Drawing Sheets

_US 10,347,046 B2_

AUGMENTED REALITY TRANSPORTATION NOTIFICATION SYSTEM

TECHNICAL FIELD

The subject matter disclosed herein generally relates to the processing of data. Specifically, the present disclosure addresses systems and methods for providing an augmented reality transportation notification.

BACKGROUND

A device can be used to generate and display data in addition to an image captured with the device. For example, augmented reality (AR) is a live, direct or indirect view of a physical, real-world environment whose elements are augmented by computer-generated sensory input such as sound, video, graphics, or Global Positioning System (GPS) data. With the help of advanced AR technology (e.g., adding computer vision and object recognition), the information about the surrounding real world of the user becomes interactive. Device-generated (e.g., artificial) information about the environment and its objects can be overlaid on an image depicting the real world.

BRIEF DESCRIPTION OF THE DRAWINGS

Some embodiments are illustrated by way of example and not limitation in the figures of the accompanying drawings.

DETAILED DESCRIPTION

Figure 1:
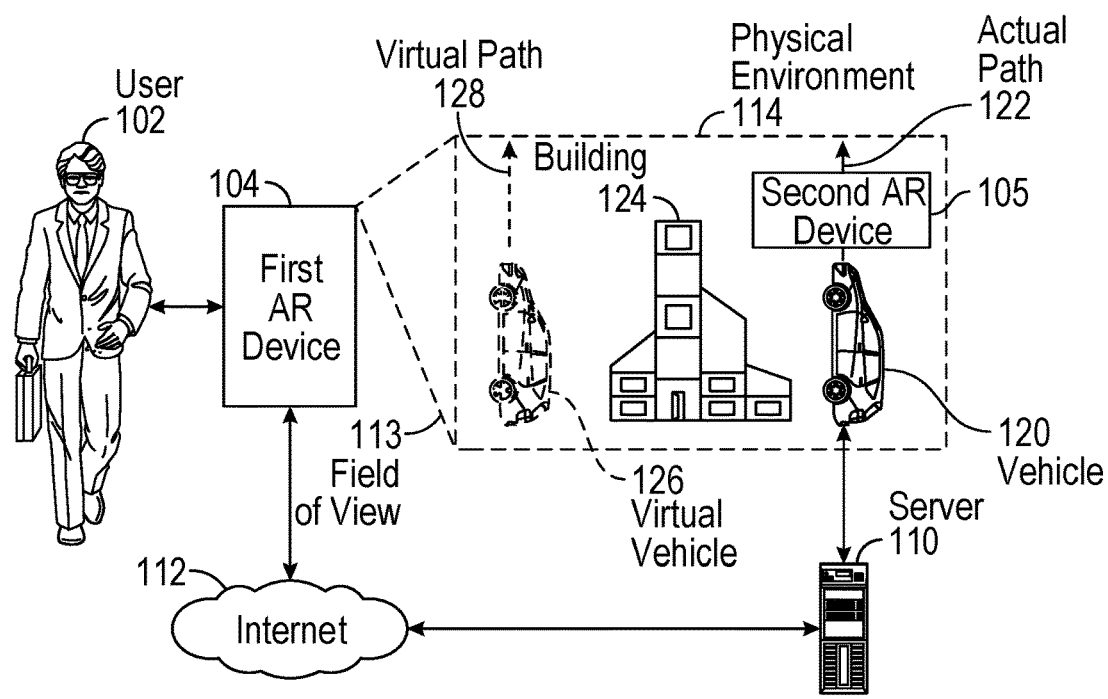
FIG. 1 is a block diagram illustrating an example of a network environment suitable for operating an augmented-reality transportation notification system, according to some example embodiments.

Example methods and systems are directed to an augmented-reality (AR) transportation notification application. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

AR applications allow a user to experience information, such as in the form of a three-dimensional virtual object overlaid on a picture of a physical object captured by a camera of a device (also referred to as an AR device). The physical object may include a visual reference that the AR application can identify. For example, the AR device uses computer vision to detect and identify the physical object. A visualization of the augmented information, such as the three-dimensional virtual object overlaid on or engaged with an image of the physical object, is generated in a display of the device. The three-dimensional virtual object may be selected based on the recognized visual reference or captured image of the physical object. A rendering of the visualization of the three-dimensional virtual object may be based on a position of the display relative to the visual reference.

In one example, the AR device is a wearable (or non-wearable) device that includes a transparent (partially transparent, or non-transparent) display. The AR device displays the augmented information in the transparent display such that the user of the AR device perceives the augmented information as an overlay on and coupled to the physical object.

The present application describes generating virtual content (also referred to as AR content) in the display of an AR device to identify a current location of another device (e.g., another AR device, or non-AR device) in a vehicle. For example, a first user of a first AR device requests a ride from a second user of a second AR device traveling in a vehicle. Typically, the location of the vehicle is shown on a map on a display of a mobile device. In contrast, the present application describes displaying a virtual vehicle that is representative of the vehicle of the second user relative to a real-world view of the physical environment at the first AR device. The first AR device displays the virtual vehicle in the display of the first AR device such that the first user perceives the virtual vehicle as part of the real-world environment (also referred to as physical environment). For example, the first user perceives the virtual vehicle moving behind a building around a corner thereby providing the first user with "x-ray" vision of the location of the virtual vehicle.

In one example, the first AR device includes a mobile computing device with a non-transparent display (e.g., a smart phone). The user raises the first AR device and holds it to capture a live view of the physical environment. For example, a camera of the first AR device captures a video or a picture of the street, buildings, and sidewalk. The first AR device determines geographic location (e.g., using GPS, Wi-Fi, Bluetooth, or other means for determining the geographic location) and an orientation of the first AR device (e.g., the first AR device is pointed north and leveled using an inertia motion unit and a compass). The first AR device displays a live or near live image of the physical environment with the virtual vehicle overlaid on top of the live image. For example, the user can see the virtual vehicle moving behind a building in the image. Furthermore, the first AR device displays a virtual path to illustrate a planned route of the virtual vehicle in the physical environment. For example, arrows or dotted lines from the virtual vehicle are displayed and appear on a road in the physical environment.

In another example, the first AR device receives an alternate or suggested pick-up location different from the geographic location of the first AR device. For example, given traffic conditions, it may be more efficient to have the vehicle pick up the user of the first AR device at a different geographic location (e.g., opposite sidewalk). The first AR device displays a virtual path overlaid on the physical environment. The virtual path directs the user to move to the alternate pick-up location. The virtual path includes, for example, arrows or dotted lines from a current location of the first AR device to the alternate suggested pick-up location. The first AR device also displays the virtual vehicle overlaid on top of the live image of the physical environment. The virtual vehicle follows a virtual route to the alternate pick-up location.

In another example, the first AR device includes a wearable device with a transparent display. The transparent display displays the virtual vehicle and the virtual path such that they appear coupled to the physical environment (e.g., road, building, etc).

In another example, the vehicle includes an AR device (also referred to as the second AR device). The second AR device displays a virtual path from a current location of the second AR device to the pick-up location of the user or the alternate pick-up location. Furthermore, the second AR device displays a virtual representation of the user (e.g., avatar, hologram, or any other virtual object) on the display of the second AR device. The virtual representation of the user appears to be coupled to the current location of the first AR device.

In one example embodiment, a first augmented-reality (AR) device comprises an optical sensor, a geographic location sensor, an orientation sensor, a display, and one or more hardware processors comprising an AR transport application. The AR transport application determines, using the geographic location sensor and the orientation sensor, a first geographic location of the first AR device and an orientation of the first AR device. The AR transport application generates, using the optical sensor, a picture at the first geographic location of the first AR device and associated with the orientation of the first AR device. The AR transport application retrieves, from a server, transportation information from a second AR device in a vehicle, the server being configured to assign the second AR device to the first AR device. The AR transport application generates transportation AR content based on the transportation information from the second AR device. The AR transport application displays the transportation AR content in the display of the first AR device based on the first geographic location of the first AR device, the orientation of the first AR device, the transportation information, and the picture generated at the first geographic location of the first AR device and associated with the orientation of the first AR device.

In another example embodiment, the transportation information includes transportation profile data identifying the vehicle and a user of the second AR device, and transportation travel data identifying a speed, a travel direction, and an estimated travel time from a second geographic location of the second AR device to the first geographic location of the first AR device.

In another example embodiment, the transportation AR content comprises vehicle AR content generated based on the transportation profile data, and travel path AR content generated based on the transportation travel data. The first AR device displays the vehicle AR content as a first overlay to the picture based on the second geographic location of the second AR device, the vehicle AR content identifying the vehicle and the user of the second AR device. The first AR device displays the travel path AR content as a second overlay to the picture based on the second geographic location, the speed, and the travel direction of the second AR device, the travel path AR content identifying a planned travel route of the vehicle on the picture.

In another example embodiment, the transportation AR content comprises vehicle AR content generated based on the transportation profile data, and travel path AR content generated based on the transportation travel data, wherein the display includes a transparent display. The first AR device displays the vehicle AR content in the transparent display based on the second geographic location of the second AR device, the vehicle AR content including a three-dimensional model of a virtual vehicle representing a color and model of the vehicle and a picture of the user of the second AR device. The first AR device also displays the travel path AR content in the transparent display based on the second geographic location, the speed, and the travel direction of the second AR device, the travel path AR content including a virtual path identifying a planned travel route of the vehicle.

In another example embodiment, the transportation AR content comprises vehicle AR content identifying the vehicle and the user of the second AR device. The first AR device scales a size of the vehicle AR content based on a distance between the first AR device and the second AR device, and displays the scaled vehicle AR content in the display based on the second geographic location of the second AR device relative to the first geographic location and orientation of the first AR device.

In another example embodiment, the transportation AR content comprises travel path AR content identifying a route, a speed, a travel direction of the second AR device, and an estimated travel time from a second geographic location of the second AR device to the first geographic location of the first AR device. The first AR device further accesses the route of the second AR device from the server, updates the second geographic location of the second AR device, updates the route based on the updated second geographic location of the second AR device, updates the travel path AR content based on the updated route, and displays the updated travel path AR content in the display, the updated travel path AR content including a virtual path between the first and second AR devices based on the updated route.

In another example embodiment, the first AR device receives a request from the server, the request identifying an alternate geographic location for the first AR device. The first AR device determines alternate location AR content identifying the alternate geographic location based on the first geographic location and orientation of the first AR device. The first AR device displays the alternate location AR content in the display, the alternate location AR content appearing coupled to a corresponding physical object depicted in the picture.

In another example embodiment, the AR transport application generates pedestrian path AR content identifying a walking path from the first geographic location of the first AR device to the alternate geographic location for the first AR device. The AR transport application also displays the pedestrian path AR content in the display, the pedestrian path AR content appearing coupled to a sidewalk depicted in the picture.

In another example embodiment, the AR transport application generates travel path AR content identifying a planned travel path of the second AR device from the first geographic location of the second AR device to the alternate geographic location for the first AR device. The AR transport application displays the travel path AR content in the display, the travel path AR content appearing coupled to a road depicted in the picture.

In another example embodiment, the AR transport application receives an identification of a third geographic location in the display from a user of the first AR device, the third geographic location identified in the picture generated at the first geographic location of the first AR device and associated with the orientation of the first AR device. The AR transport application generates a request for the alternate geographic location to the server based on the third geographic location. The AR transport application generates travel path AR content identifying a planned travel path of the second AR device from a second geographic location of the second AR device to the third geographic location. The travel path AR content is displayed in the display of the first AR device.

In another example embodiment, a non-transitory machine-readable storage device may store a set of instructions that, when executed by at least one processor, causes the at least one processor to perform the method operations discussed within the present disclosure.

FIG. 1 is a block diagram illustrating an example of a network environment suitable for operating an augmented-reality transportation notification system, according to some example embodiments. The network environment includes a first AR device 104, a second AR device 105, and a server 110 communicatively coupled to each other via a computer network (e.g., the Internet 112). The AR devices 104, 105 may be part of or located at a physical environment 114 (e.g., a geographic location with a one-mile radius).

The user 102 operates a ride-sharing application on the first AR device 104 to request a ride. The server 110 receives a request for a ride from the first AR device 104 and assigns vehicle 120 to pick up the user 102 at the geographic location of the first AR device 104. In one example, the server 110 sends the geographic location of the first AR device 104 to the second AR device 105 located inside the vehicle 120.

In one example embodiment, the user 102 wears the first AR device 104 or looks at a display of the first AR device 104. The user 102 directs the first AR device 104 towards the physical environment 114. The first AR device 104 includes a camera with a field of view 113 that optically captures the physical environment 114. The first AR device 104 takes a picture or a video of the physical environment 114. For example, if the user 102 is located in a city, the physical environment 114 includes a building 124. Traditionally, the geographic location of the vehicle 120 is identified and represented on a map. In contrast, a current geographic location of the vehicle 120 is identified and represented in the physical environment 114 using augmented reality to display a virtual vehicle 126. For example, the vehicle 120 is located behind the building 124 relative to a geographic location of the first AR device 104. Therefore, the user 102 cannot directly see the vehicle 120 because the vehicle 120 is blocked by the building 124. However, the first AR device 104 generates and displays a virtual vehicle 126 representative of the vehicle 120. In one example embodiment, the size of the virtual vehicle 126 is scaled and the depth of the virtual vehicle 126 is adjusted such that the virtual vehicle 126 appears behind the building 124. As the vehicle 120 travels closer to the user 102, the size of the virtual vehicle 126 becomes larger. Furthermore, the first AR device 104 displays a virtual path 128 based on travel information (e.g., direction, speed, location) from the second AR device 105. The virtual path 128 includes, for example, a dotted line showing a planned route for the vehicle 120 in the physical environment 114.

In another example, the driver of the vehicle 120 wears the second AR device 105 or couples the second AR device 105 to a dashboard of the vehicle 120. In another example, the second AR device 105 is incorporated in the vehicle 120 as a head's up display (HUD) on a windshield of the vehicle 120. The second AR device 105 displays directions to the geographic location of the first AR device 104 as augmented information in the physical environment 114 in the form of virtual objects (e.g., virtual arrow or line) appearing on the road to guide the driver of the vehicle 120. In another example, the virtual arrows or lines lead up to a virtual user displayed as an overlay to the physical environment 114. A virtual representation of the user 102 appears in a display of the second AR device 105. Those of ordinary skills in the art will recognize that other augmented reality information can be displayed at the second AR device 105 based on a profile of the user 102, and changes in the geographic location of the first AR device 104, or alternate pick up locations in the physical environment 114.

In another example, the first and second AR devices 104, 105 display AR information overlaid on top of an image or a view of the physical environment 114. The AR information appears affixed or coupled to physical objects within the physical environment 114. For example, the user 102 sees a three-dimensional model of the vehicle 120 moving behind the building 124 relative to the user 102. The driver of the vehicle 120 sees an avatar of the user 102 behind the building 124 relative to the driver.

In one example embodiment, the first AR device 104 includes a wearable computing device (e.g., smart glasses, a smart visor, smart eyewear, a smart helmet, or a smart phone) that the user 102 can wear to see or experience the AR content related to a physical object within the physical environment 114, or other predefined physical objects at a specific geographic location or position in the physical environment 114.

The user 102 may be a user of an AR application executed in the first AR device 104 or the server 110. The user 102 may be a human user (e.g., a human being), a machine user (e.g., a computer configured by a software program to interact with the first AR device 104), or any suitable combination thereof (e.g., a human assisted by a machine or a machine supervised by a human). The user 102 is not part of the network environment, but is associated with the first AR device 104.

The first AR device 104, second AR device 105, and the server 110 may each be implemented in a computer system, in whole or in part, as described below with respect to FIG. 10.

The server 110 may be part of a network-based system. For example, the network-based system may be or include a cloud-based server system that provides AR content (e.g., AR experiences including three-dimensional (3D) models of virtual objects, animations, images, and video) to the first and second AR devices 104, 105.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The computer network (e.g., the Internet 112) may be any network that enables communication between or among machines (e.g., the server 110), databases, and devices (e.g., the AR devices 104, 105). Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
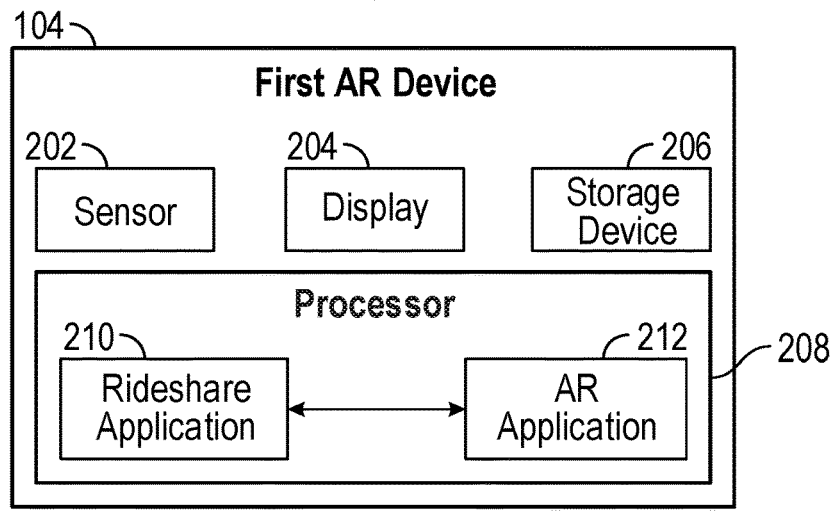
FIG. 2 is a block diagram illustrating modules (e.g., components) of an augmented-reality device, according to some example embodiments.

FIG. 2 is a block diagram illustrating an example embodiment of the first AR device 104. The first AR device 104 may be a mobile computing device (e.g., a wearable device) that includes sensors 202, a display 204, a storage device 206, and a processor 208. The first AR device 104 may include any type of device that can be worn on the head of a user (e.g., the user 102), such as glasses, a helmet, a hat, or a visor.

The sensors 202 may be used to generate internal tracking data (e.g., using gyroscope data, accelerometer data, or inertial motion unit data) of the first AR device 104 to determine a position and an orientation of the first AR device 104. The position and the orientation of the AR device 104 may be used to identify real-world objects in the physical environment 114 in the field of view 113 of an optical sensor of the first AR device 104. For example, a virtual object may be rendered and displayed in the display 204 when the sensors 202 indicate that the first AR device 104 detects or is oriented towards a predefined real-world object (e.g., when the user 102 looks at a particular street, building, billboard, or sign). In another example, the first AR device 104 displays a virtual object (also referred to as augmented information, virtual content, or synthetic content) based on sensor data related to a geographic location of the first AR device 104 and information about the vehicle 120 (e.g., make, model, color of the vehicle, driver profile, location, speed, distance between the first AR device 104 and the second AR device 105 in the vehicle 120).

Examples of sensors 202 include a camera, a depth sensor (to map the physical environment 114), an audio sensor, an Inertial Motion Unit (IMU) sensor, a geographic location sensor, a barometer, a humidity sensor, an ambient-light sensor, and a biometric sensor. It is to be noted that the sensors 202 described herein are for illustration purposes. The sensors 202 are thus not limited to the ones described.

The display 204 includes a display surface or lens capable of displaying AR content (e.g., an image of a virtual display or monitor) generated by the processor 208. The display 204 may be transparent so that the user 102 can see through the display 204 (e.g., such as a head-up display). The transparent display displays the AR content such that it appears coupled to physical objects in the physical environment 114 detected by the sensor 202 (e.g., optical sensor).

In another example, the display 204 includes a non-transparent display. For non-transparent displays, the user 102 holds up the first AR device 104 to an eye level and looks at the display 204. The display 204 displays a picture or video captured with the sensor 202 (e.g., an optical sensor) of the physical environment 114. The display 204 further displays the AR content as a layer on top of the picture or video. The AR content appears to be coupled to objects or items in the picture or video.

The storage device 206 stores a library of AR content, geographic locations, relative locations and positions, and a profile of the user 102. The AR content includes two- or three-dimensional models of virtual objects with or without corresponding audio. In another example, the storage device 206 may also store a database that identifies reference objects (e.g., visual references or unique identifiers associated with physical objects, such as using computer vision to recognize unique patterns on a building or billboard, or street names or signs in the physical environment 114) and corresponding AR content (e.g., animations, 3D virtual objects such as a three-dimensional model of a specific vehicle, or interactive features of the 3D virtual objects such as flashing or blinking animation).

In one example embodiment, the first AR device 104 communicates over the Internet 112 with the server 110 to request a ridesharing service. The server 110 identifies the location of the first AR device 104 and identifies the vehicle 120 based on the location of the user 102 and the availability of the driver of the vehicle 120. The server 110 provides user information related to the user 102 and the first AR device 104 to the second AR device 105. The second AR device 105 uses the user information to generate AR content that identifies the user 102 and illustrates a route to the user 102 in the physical environment 114. The server 110 also provides transportation information related to the user of the second AR device 105 and the vehicle 120 to the first AR device 104. The first AR device 104 uses the transportation information to generate AR content that identifies the driver and illustrates a route of the vehicle to the user 102 in the physical environment 114.

The processor 208 includes a rideshare application 210 and an AR application 212. The rideshare application 210 enables the user 102 to request a ride from drivers of vehicles associated with the ridesharing service. The rideshare application 210 identifies and provides the geographic location of the first AR device 104 to the server 110. The server 110 assigns a vehicle to the user 102. In one example, the rideshare application 210 receives transportation information (e.g., vehicle profile, driver profile, current distance to the user 102) related to the assigned vehicle (e.g., vehicle 120).

The AR application 212 generates a display of virtual content based on the transportation information from the rideshare application 210. For example, the AR application 212 renders a three-dimensional model of a car matching the make and model of the vehicle 120. Furthermore, the AR application 212 displays an image of the driver hovering above the three-dimensional virtual car. The AR application 212 also adjusts the displayed size of the three-dimensional virtual car based on a distance between first AR device 104 and the second AR device 105 in the vehicle 120. Furthermore, the AR application 212 displays the virtual vehicle 126 relative to the physical environment 114. For example, the user 102 sees the virtual vehicle 126 traveling behind the building 124 following a virtual path 128 based on the actual path 122 of the vehicle 120. The AR application 212 displays the virtual path 128 in the display 204.

Figure 3:
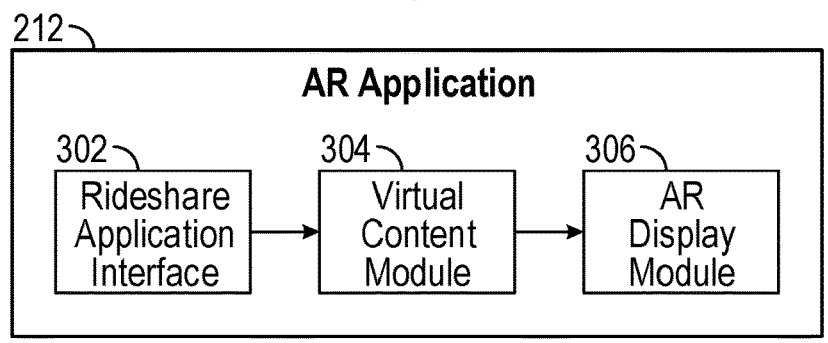
FIG. 3 is a block diagram illustrating modules (e.g., components) of an augmented-reality transportation application, according to some example embodiments.

FIG. 3 is a block diagram illustrating modules (e.g., components) of the AR application 212, according to some example embodiments. The AR application 212 includes a rideshare application interface 302, a virtual content module 304, and an AR display module 306.

The rideshare application interface 302 communicates with the rideshare application 210 to access information related to the vehicle 120, the driver of the vehicle 120, and the second AR device 105. For example, the rideshare application interface 302 retrieves a profile picture and the name of the driver of the vehicle 120. Furthermore, the rideshare application interface 302 retrieves the color, make, and model information of the vehicle 120, the current geographic location of the vehicle 120, the current speed of the vehicle 120, the direction in which the vehicle 120 is traveling, a route of the vehicle 120, and a pick-up location.

The virtual content module 304 generates AR content based on the information retrieved using the rideshare application interface 302. For example, the virtual content module 304 generates a three-dimensional model of the vehicle 120 based on the color, make, and model. The virtual content module 304 further generates a virtual content that includes an image of the driver of the vehicle 120. The virtual content module 304 also generates a virtual route or path (e.g., virtual path 128) that appears coupled to the roads in the physical environment 114. In other words, the user 102 perceives a virtual travel route in the real-world environment as opposed to seeing a path on a map. In another example embodiment, the virtual content module 304 generates an alternate AR content for an alternate pick location. The alternative AR content includes a virtual path for the user 102 to walk or move to a more convenient pick-up location (e.g., alternate pick up location). The alternate pick-up location can be determined based on several factors such as traffic, time of pick up, constructions around the original pick-up location, detours, and so forth. The rideshare application interface 302 identifies the alternate pick-up location from the rideshare application 210.

The AR display module 306 displays the AR content generated by the virtual content module 304 in the display 204 of the first AR device 104. For example, the AR display module 306 renders the three-dimensional model of the vehicle 120 in the display 204. The AR display module 306 further adjusts the display of the three-dimensional model of the vehicle 120 based on the location and speed of the second AR device 105 in the vehicle 120. The AR display module 306 further displays the virtual path 128 of the virtual vehicle 126 within the context of the physical environment 114. For example, the virtual path 128 appears coupled to actual roads in the physical environment 114. In another example, the AR display module 306 further displays the alternate path for the user to move to an alternate pick-up location. The alternate path appears as dotted lines on the ground leading to the alternate pick-up location.

In another example embodiment, the second AR device 105 includes the same components as the first AR device 104. However, for the second AR device 105, the virtual content module 304 includes AR content illustrating a virtual path to the user 102 or to the alternate pick-up location. The AR display module 306 renders a display of a virtual user 102 in a display of the second AR device 105 or in a windshield of the vehicle 120.

Figure 4:
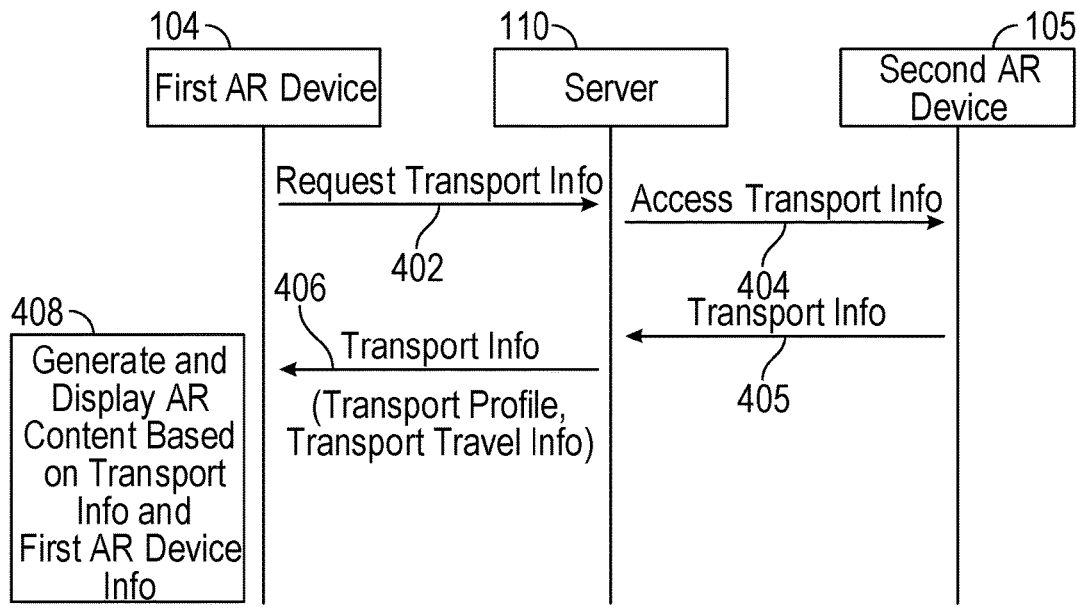
FIG. 4 is a block diagram illustrating interactions among a first augmented-reality device, a server, and a second augmented-reality device, according to some example embodiments.

FIG. 4 is a block diagram illustrating interactions among the first AR device 104, the server 110, and the second AR device 105, according to some example embodiments. At operation 402, the first AR device 104 requests transport information related to the vehicle 120 and the driver of the vehicle 120. At operation 404, the server 110 requests the transport information (e.g., geographic location, speed, direction of travel) from the second AR device 105. At operation 405, the server 110 receives the transport information from the second AR device 105. At operation 406, the first AR device 104 receives the transport information (e.g., transport profile such as car and driver profile, transport travel information such as location, speed, and direction) from the server 110. At operation 408, the first AR device 104 generates and displays AR content based on the transport information and the first AR device information (e.g., location of the first AR device 104).

Figure 5:
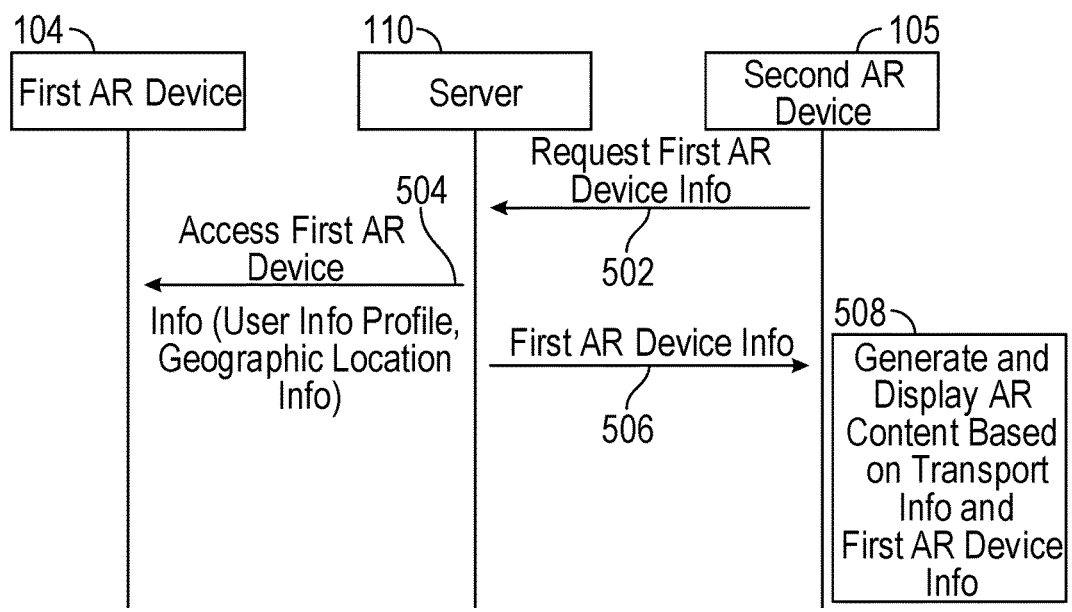
FIG. 5 is a block diagram illustrating interactions among a first augmented-reality device, a server, and a second augmented-reality device, according to some example embodiments.

FIG. 5 is a block diagram illustrating interactions among the first AR device 104, the server 110, and the second AR device 105, according to some example embodiments. At operation 502, the second AR device 105 requests first AR device information from the server 110. At operation 504, the server 110 accesses the first AR device information (e.g., user information profile such as the name and picture of the user 102, geographic location information such as location of the first AR device 104) from the first AR device 104. At operation 506, the server 110 sends the first AR device information to the second AR device 105. At operation 508, the second AR device 105 generates and displays AR content based on the first AR device information (e.g., location of the first AR device 104) and transport information.

Figure 6:
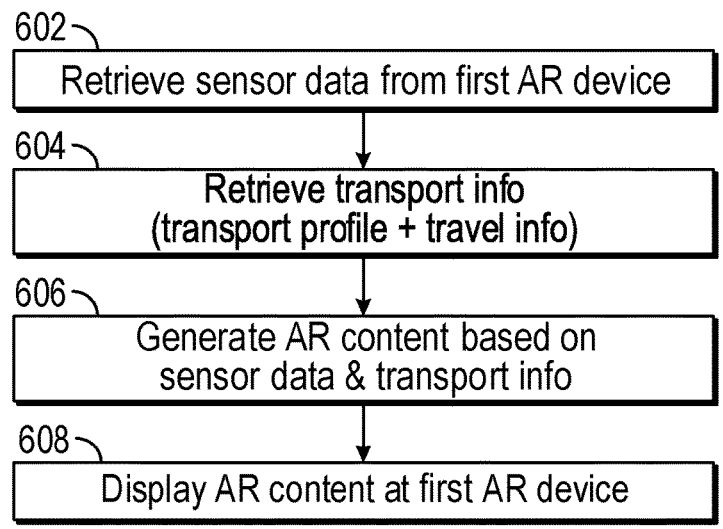
FIG. 6 is a flowchart illustrating an example operation of an augmented-reality transportation application at a first augmented-reality device, according to some example embodiments.

FIG. 6 is a flowchart illustrating an example operation of the AR application 212, according to some example embodiments. At operation 602, the AR application 212 retrieves sensor data from the first AR device 104. In one example embodiment, operation 602 may be implemented by accessing data from sensors 202.

At operation 604, the first AR device 104 retrieves transportation information related to the vehicle 120. In one example embodiment, operation 604 may be implemented using the rideshare application interface 302.

At operation 606, the first AR device 104 generates AR content based on the transportation information. In one example embodiment, operation 606 may be implemented using the virtual content module 304.

At operation 608, the first AR device 104 displays the AR content in the display 204. In one example embodiment, operation 608 may be implemented using the AR display module 306.

Figure 7:
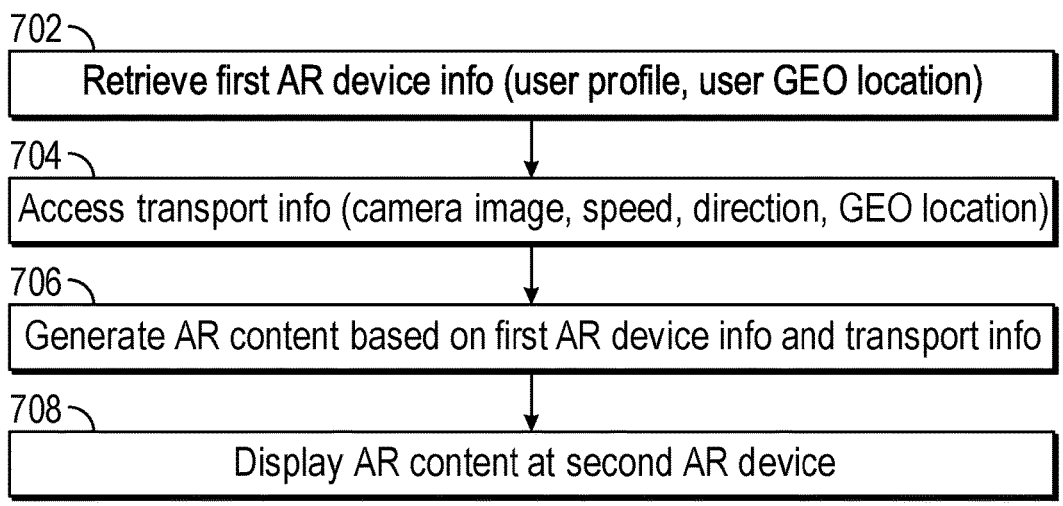
FIG. 7 is a flowchart illustrating another example operation of an augmented-reality transportation application at a second augmented-reality device, according to some example embodiments.

FIG. 7 is a flowchart illustrating an example operation of an AR application in the second AR device 105, according to some example embodiments. At operation 702, the second AR device 105 retrieves first AR device information (e.g., user profile, user geographic location) from the first AR device 104. In one example embodiment, operation 702 may be implemented by accessing data from a rideshare application operating at the second AR device 105.

At operation 704, the second AR device 105 retrieves transportation information related to the vehicle 120. In one example embodiment, operation 704 may be implemented using the rideshare application interface 302.

At operation 706, the second AR device 105 generates AR content based on the transportation information. In one example embodiment, operation 706 may be implemented using the virtual content module 304.

At operation 708, the second AR device 105 displays the AR content in a display of the second AR device 105. In one example embodiment, operation 708 may be implemented using the AR display module 306.

Figure 8:
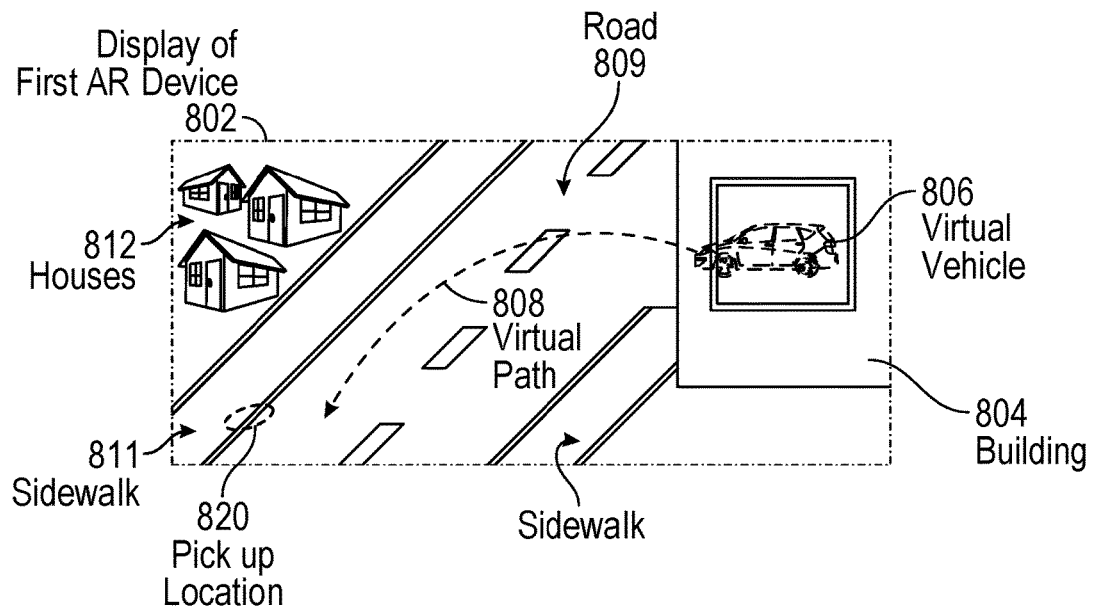
FIG. 8 is a block diagram illustrating an example of a display in a first augmented-reality device, according to some example embodiments.

FIG. 8 is a block diagram illustrating an example of a display 802 of the first AR device 104. The display 802 displays AR content (e.g., virtual path 808, pick-up location 820, virtual vehicle 806) overlaid on a real-world physical object (e.g., road 809, building 804). The user 102 of the first AR device 104 perceives the AR content as part of the real world. In particular, the AR content appears coupled to the real-world physical object. For example, the user 102 perceives the pick-up location 820 as a static location relative to the road 809, sidewalk 811, and house 812. The virtual vehicle 806 appears to move in real-time based on a speed of the second AR device 105. In the example of FIG. 8, the user 102 perceives the virtual vehicle 806 behind the building 804.

Figure 9:
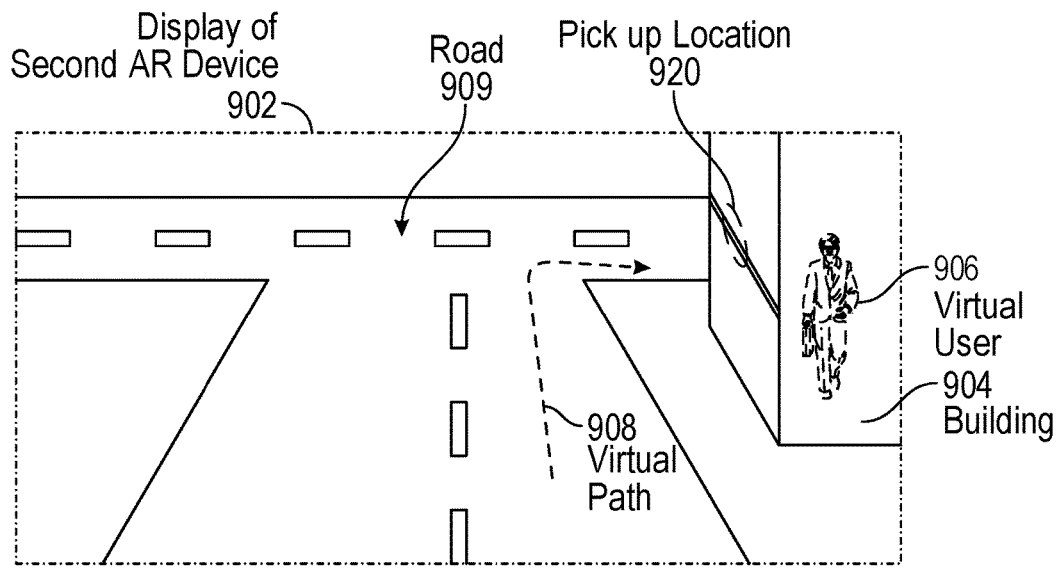
FIG. 9 is a block diagram illustrating an example of a display in a second augmented-reality device, according to some example embodiments.

FIG. 9 is a block diagram illustrating an example of a display 902 of the second AR device 105. The display 902 (e.g., HUD of the vehicle 120) displays AR content (e.g., virtual path 908, pick-up location 920, virtual user 906) overlaid on a real-world physical object (e.g., road 909, building 904). The user of the second AR device 105 perceives the AR content as part of the real world. In particular, the AR content appears coupled to the real-world physical object. For example, the user perceives the pick-up location 920 as a static location relative to the road 909 and building 904. The virtual user 906 appears to move in real-time based on a speed of the first AR device 104. In the example of FIG. 9, the driver of the vehicle 120 perceives the virtual user 906 behind the building 904.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer, or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry (e.g., an FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
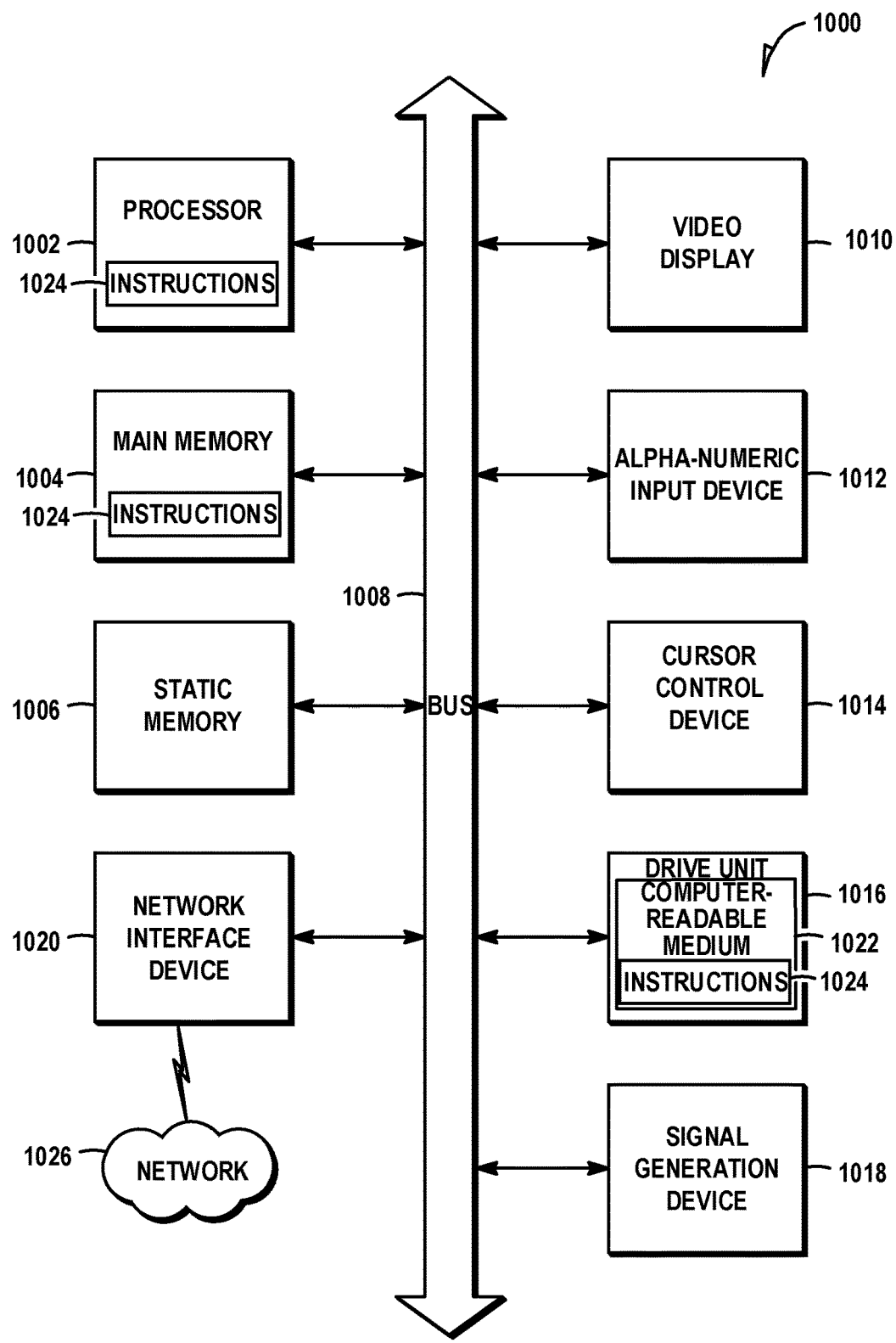
FIG. 10 is a block diagram illustrating components of a machine, according to some example embodiments, able to read instructions from a machine-readable medium and perform any one or more of the methodologies discussed herein.

FIG. 10 is a block diagram of a machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP)). Examples of communication networks include a local-area network (LAN), a wide-area network (WAN), the Internet, mobile telephone networks, plain old telephone service (POTS) networks, and wireless data networks (e.g., Wi-Fi and WiMAX networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A first augmented-reality (AR) device comprising:
an optical sensor;
a geographic location sensor;
an orientation sensor a display; and
one or more hardware processors comprising an AR transport application, the AR transport application configured to perform operations comprising:
determining, using the geographic location sensor and the orientation sensor, a first geographic location of the first AR device and an orientation of the first AR device;
generating, using the optical sensor, a picture at the first geographic location of the first AR device and associated with the orientation of the first AR device;
retrieving, from a server, transportation information from a second AR device in a vehicle, the server being configured to assign the second AR device to the first AR device;
generating transportation AR content based on the transportation information from the second AR device; and
displaying the transportation AR content in the display of the first AR device based on the first geographic location of the first AR device, the orientation of the first AR device, the transportation information, and the picture generated at the first geographic location of the first AR device and associated with the orientation of the first AR device,
wherein the transportation information includes:
transportation profile data identifying the vehicle and a user of the second AR device, and
transportation travel data identifying a speed, a travel direction, and an estimated travel time from a second geographic location of the second AR device to the first geographic location of the first AR device,
wherein the transportation AR content comprises vehicle AR content generated based on the transportation profile data, and travel path AR content generated based on the transportation travel data,
wherein displaying the transportation AR content in the display of the first AR device further comprises:
displaying the vehicle AR content as a first overlay to the picture based on the second geographic location of the second AR device, the vehicle AR content identifying the vehicle and the user of the second AR device; and
displaying the travel path AR content as a second overlay to the picture based on the second geographic location, the speed, and the travel direction of the second AR device, the travel path AR content identifying a planned travel route of the vehicle on the picture.

2. The first AR device of claim 1, wherein the transportation AR content comprises vehicle AR content generated based on the transportation profile data, and travel path AR content generated based on the transportation travel data, wherein the display includes a transparent display,
wherein displaying the transportation AR content in the display of the first AR device further comprises:
displaying the vehicle AR content in the transparent display based on the second geographic location of the second AR device, the vehicle AR content including a three-dimensional model of a virtual vehicle representing a color and model of the vehicle and a picture of the user of the second AR device; and
displaying the travel path AR content in the transparent display based on the second geographic location, the speed, and the travel direction of the second AR device, the travel path AR content including a virtual path identifying a planned travel route of the vehicle.

3. The first AR device of claim 1, wherein the transportation AR content comprises vehicle AR content identifying the vehicle and the user of the second AR device,
wherein displaying the transportation AR content in the display of the first AR device further comprises:

scaling a size of the vehicle AR content based on a distance between the first AR device and the second AR device; and displaying the scaled vehicle AR content in the display based on the second geographic location of the second AR device relative to the first geographic location and orientation of the first AR device.

4. The first AR device of claim 1, wherein the transportation AR content comprises travel path AR content identifying a route, a speed, a travel direction of the second AR device, and an estimated travel time from a second geographic location of the second AR device to the first geographic location of the first AR device, wherein displaying the transportation AR content in the display of the first AR device further comprises:
accessing the route of the second AR device from the server;
updating the second geographic location of the second AR device;
updating the route based on the updated second geographic location of the second AR device;
updating the travel path AR content based on the updated route; and
displaying the updated travel path AR content in the display, the updated travel path AR content including a virtual path between the first and second AR devices based on the updated route.

5. The first AR device of claim 1, wherein the operations further comprise:
receiving a request from the server, the request identifying an alternate geographic location for the first AR device;
determining alternate location AR content identifying the alternate geographic location based on the first geographic location and orientation of the first AR device; and
displaying the alternate location AR content in the display, the alternate location AR content appearing coupled to a corresponding physical object depicted in the picture.

6. The first AR device of claim 5, wherein the operations further comprise:
generating pedestrian path AR content identifying a walking path from the first geographic location of the first AR device to the alternate geographic location for the first AR device; and
displaying the pedestrian path AR content in the display, the pedestrian path AR content appearing coupled to a sidewalk depicted in the picture.

7. The first AR device of claim 6, wherein the operations further comprise:
generating travel path AR content identifying a planned travel path of the second AR device from the first geographic location of the second AR device to the alternate geographic location for the first AR device; and
displaying the travel path AR content in the display, the travel path AR content appearing coupled to a road depicted in the picture.

8. The first AR device of claim 1, wherein the operations further comprise:
receiving an identification of a third geographic location in the display from a user of the first AR device, the third geographic location identified in the picture generated at the first geographic location of the first AR device and associated with the orientation of the first AR device;
generating a request for the alternate geographic location to the server based on the third geographic location;

generating travel path AR content identifying a planned travel path of the second AR device from a second geographic location of the second AR device to the third geographic location; and
displaying the travel path AR content in the display.

9. A method comprising:
determining, using a geographic location sensor and an orientation sensor of a first AR device, a first geographic location of the first AR device and an orientation of the first AR device;
generating, using an optical sensor of the first AR device, a picture at the first geographic location of the first AR device and associated with the orientation of the first AR device;
retrieving, from a server, transportation information from a second AR device in a vehicle, the server being configured to assign the second AR device to the first AR device;
generating transportation AR content based on the transportation information from the second AR device; and
displaying the transportation AR content in a display of the first AR device based on the first geographic location of the first AR device, the orientation of the first AR device, the transportation information, and the picture generated at the first geographic location of the first AR device and associated with the orientation of the first AR device, wherein the transportation information includes:
transportation profile data identifying the vehicle and a user of the second AR device, and
transportation travel data identifying a speed, a travel direction, and an estimated travel time from a second geographic location of the second AR device to the first geographic location of the first AR device, wherein the transportation AR content comprises vehicle AR content generated based on the transportation profile data, and travel path AR content generated based on the transportation travel data, wherein displaying the transportation AR content in the display of the first AR device further comprises:
displaying the vehicle AR content as a first overlay to the picture based on the second geographic location of the second AR device, the vehicle AR content identifying the vehicle and the user of the second AR device; and
displaying the travel path AR content as a second overlay to the picture based on the second geographic location, the speed, and the travel direction of the second AR device, the travel path AR content identifying a planned travel route of the vehicle on the picture.

10. The method of claim 9, wherein the transportation AR content comprises vehicle AR content generated based on the transportation profile data, and travel path AR content generated based on the transportation travel data, wherein the display includes a transparent display, wherein displaying the transportation AR content in the display of the first AR device further comprises:
displaying the vehicle AR content in the transparent display based on the second geographic location of the second AR device, the vehicle AR content including a three-dimensional model of a virtual vehicle representing a color and model of the vehicle and a picture of the user of the second AR device; and
displaying the travel path AR content in the transparent display based on the second geographic location, the speed, and the travel direction of the second AR device, the travel path AR content including a virtual path identifying a planned travel route of the vehicle.

11. The method of claim 9, wherein the transportation AR content comprises vehicle AR content identifying the vehicle and the user of the second AR device,
wherein displaying the transportation AR content in the display of the first AR device further comprises:
scaling a size of the vehicle AR content based on a distance between the first AR device and the second AR device; and
displaying the scaled vehicle AR content in the display based on the second geographic location of the second AR device relative to the first geographic location and orientation of the first AR device.

12. The method of claim 9, wherein the transportation AR content comprises travel path AR content identifying a route, a speed, a travel direction of the second AR device, and an estimated travel time from a second geographic location of the second AR device to the first geographic location of the first AR device,
wherein displaying the transportation AR content in the display of the first AR device further comprises:
accessing the route of the second AR device from the server;
updating the second geographic location of the second AR device;
updating the route based on the updated second geographic location of the second AR device;
updating the travel path AR content based on the updated route; and
displaying the updated travel path AR content in the display, the updated travel path AR content including a virtual path between the first and second AR devices based on the updated route.

13. The method of claim 9, wherein the operations further comprise:
receiving a request from the server, the request identifying an alternate geographic location for the first AR device;
determining alternate location AR content identifying the alternate geographic location based on the first geographic location and orientation of the first AR device; and
displaying the alternate location AR content in the display, the alternate location AR content appearing coupled to a corresponding physical object depicted in the picture.

14. The method of claim 13, wherein the operations further comprise:
generating pedestrian path AR content identifying a walking path from the first geographic location of the first AR device to the alternate geographic location for the first AR device; and
displaying the pedestrian path AR content in the display, the pedestrian path AR content appearing coupled to a sidewalk depicted in the picture.

15. The method of claim 14, wherein the operations further comprise:

generating travel path AR content identifying a planned travel path of the second AR device from the first geographic location of the second AR device to the alternate geographic location for the first AR device; and
displaying the travel path AR content in the display, the travel path AR content appearing coupled to a road depicted in the picture.

16. A non-transitory machine-readable medium comprising instructions that, when executed by one or more processors of a machine, cause the machine to perform operations comprising:
determining, using a geographic location sensor and an orientation sensor of a first AR device, a first geographic location of the first AR device and an orientation of the first AR device;
generating, using an optical sensor of the first AR device, a picture at the first geographic location of the first AR device and associated with the orientation of the first AR device;
retrieving, from a server, transportation information from a second AR device in a vehicle, the server being configured to assign the second AR device to the first AR device;
generating transportation AR content based on the transportation information from the second AR device; and
displaying the transportation AR content in a display of the first AR device based on the first geographic location of the first AR device, the orientation of the first AR device, the transportation information, and the picture generated at the first geographic location of the first AR device and associated with the orientation of the first AR device,
wherein the transportation information includes:
transportation profile data identifying the vehicle and a user of the second AR device, and
transportation travel data identifying a speed, a travel direction, and an estimated travel time from a second geographic location of the second AR device to the first geographic location of the first AR device,
wherein the transportation AR content comprises vehicle AR content generated based on the transportation profile data, and travel path AR content generated based on the transportation travel data,
wherein displaying the transportation AR content in the display of the first AR device further comprises:
displaying the vehicle AR content as a first overlay to the picture based on the second geographic location of the second AR device, the vehicle AR content identifying the vehicle and the user of the second AR device; and
displaying the travel path AR content as a second overlay to the picture based on the second geographic location, the speed, and the travel direction of the second AR device, the travel path AR content identifying a planned travel route of the vehicle on the picture.

* * * * *